(12) United States Patent
Kang et al.

(10) Patent No.: US 9,019,232 B2
(45) Date of Patent: Apr. 28, 2015

(54) TOUCH SCREEN PANEL

(71) Applicant: Samsung Display Co., Ltd., Yongin, Gyeonggi-Do (KR)

(72) Inventors: Sung-Ku Kang, Yongin (KR); Choon-Hyop Lee, Yongin (KR); Jeong-Heon Lee, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 91 days.

(21) Appl. No.: 13/791,556

(22) Filed: Mar. 8, 2013

(65) Prior Publication Data

US 2014/0168109 A1 Jun. 19, 2014

(30) Foreign Application Priority Data

Dec. 14, 2012 (KR) ........................ 10-2012-0146482

(51) Int. Cl.
*G09G 5/00* (2006.01)
*G06F 3/044* (2006.01)

(52) U.S. Cl.
CPC ...... *G06F 3/044* (2013.01); *G06F 2203/04111* (2013.01)

(58) Field of Classification Search
CPC ... G09G 3/041; G09G 3/0412; G09G 3/0414; G09G 3/0416; G09G 3/044; G09G 3/045; G09G 3/047; G09G 3/03547; G09G 2203/04103; G09G 2203/04111; G09G 2203/04112; G06F 3/044
USPC ........ 345/173, 174; 349/12; 178/18.03, 18.06
See application file for complete search history.

(56) References Cited

U.S. PATENT DOCUMENTS

| 7,742,041 | B2 | 6/2010 | Lee et al. | |
|---|---|---|---|---|
| 7,920,129 | B2 | 4/2011 | Hotelling et al. | |
| 8,217,902 | B2 | 7/2012 | Chang et al. | |
| 8,546,705 | B2 * | 10/2013 | Chang et al. ............... | 178/18.06 |
| 2007/0242054 | A1 * | 10/2007 | Chang et al. .................. | 345/173 |
| 2009/0273572 | A1 * | 11/2009 | Edwards et al. .............. | 345/173 |
| 2010/0231549 | A1 * | 9/2010 | Chien et al. .................... | 345/174 |
| 2010/0253646 | A1 * | 10/2010 | Hiratsuka ...................... | 345/174 |
| 2011/0128240 | A1 * | 6/2011 | Choi ............................. | 345/173 |
| 2011/0134073 | A1 * | 6/2011 | Ahn .............................. | 345/174 |

(Continued)

FOREIGN PATENT DOCUMENTS

| KR | 2012-0062178 A | 6/2012 |
|---|---|---|
| KR | 2012-0065686 A | 6/2012 |

*Primary Examiner* — Tom Sheng
(74) *Attorney, Agent, or Firm* — Robert E. Bushnell, Esq.

(57) ABSTRACT

A touch screen panel includes a substrate having first and second surfaces opposite to each other, a plurality of first sensing electrodes formed on the first surface of the substrate and connected in a first direction, a plurality of second sensing electrodes arranged between the first sensing electrodes and connected in a second direction intersecting the first direction, first connecting patterns connecting the first sensing electrodes in the first direction, a plurality of third sensing electrodes formed on the second surface of the substrate and overlapping the first sensing electrodes, a plurality of fourth sensing electrodes arranged between the third sensing electrodes and overlapping the second sensing electrodes, and second connecting patterns connecting the fourth sensing electrodes in the second direction. The sensing electrodes of the first surface and the sensing electrodes of the second surface overlap each other and are electrically connected to each other through vertical connecting units.

13 Claims, 8 Drawing Sheets

(56) References Cited

U.S. PATENT DOCUMENTS

| | | | |
|---|---|---|---|
| 2011/0193793 A1* | 8/2011 | An et al. | 345/173 |
| 2011/0234530 A1* | 9/2011 | Kim et al. | 345/174 |
| 2011/0279410 A1* | 11/2011 | Han et al. | 345/174 |
| 2011/0304578 A1* | 12/2011 | Kim et al. | 345/174 |
| 2012/0019473 A1* | 1/2012 | Edwards | 345/174 |
| 2012/0056664 A1 | 3/2012 | Nam | |
| 2012/0098791 A1* | 4/2012 | Hamada et al. | 345/174 |
| 2012/0147467 A1 | 6/2012 | Park | |
| 2012/0162099 A1 | 6/2012 | Yoo et al. | |
| 2012/0218221 A1* | 8/2012 | Igeta | 345/174 |
| 2012/0235931 A1 | 9/2012 | Lee et al. | |
| 2013/0009908 A1 | 1/2013 | Kuo | |
| 2013/0106752 A1* | 5/2013 | Lin et al. | 345/173 |
| 2013/0155011 A1* | 6/2013 | Kim et al. | 345/174 |
| 2013/0207911 A1* | 8/2013 | Barton et al. | 345/173 |
| 2013/0257785 A1* | 10/2013 | Brown et al. | 345/174 |
| 2013/0257786 A1* | 10/2013 | Brown et al. | 345/174 |
| 2014/0002378 A1* | 1/2014 | Kim et al. | 345/173 |
| 2014/0035833 A1* | 2/2014 | Gorsica et al. | 345/173 |
| 2014/0041216 A1* | 2/2014 | Cok | 29/846 |
| 2014/0043280 A1* | 2/2014 | Cok | 345/174 |
| 2014/0055403 A1* | 2/2014 | Cok | 345/174 |

\* cited by examiner

TOUCH SCREEN PANEL

CLAIM OF PRIORITY

This application makes reference to, incorporates into this specification the entire contents of, and claims all benefits accruing under 35 U.S.C. §119 from an application earlier filed in the Korean Intellectual Property Office filed on Dec. 14, 2012 and there duly assigned Serial No. 10-2012-0146482.

BACKGROUND OF THE INVENTION

1. Field of the Invention

The present invention relates to a touch screen panel, and more particularly, to a flexible touch screen panel.

2. Description of the Related Art

A touch screen panel is an input device capable of selecting the indication content displayed on the screen of an image display device by a human hand or an object to input the command of a user.

Therefore, the touch screen panel is provided on the front face of the image display device to convert a contact position of the human hand or the object into an electrical signal. Thus, the indication content selected in the contact position is received as an input signal.

Since the touch screen panel may replace an additional input device coupled to the image display device to operate, such as a keyboard and a mouse, the use range is gradually increasing.

Methods of realizing a touch screen panel include a resistance layer method, a photo-sensing method, and an electro-capacitive method. Among the above methods, the widely used electro-capacitive touch screen panel senses a change in capacitance formed by a conductive sensing electrode with another peripheral sensing electrode or a ground electrode when the human hand or the object contacts the touch screen panel to convert the contact position into the electrical signal.

The electro-capacitive touch screen panel is commonly attached to the external surface of the image display device, such a liquid crystal display (LCD) and an organic light emitting display (OLED), to be produced. Therefore, the touch screen panel requires high transparency and small thickness characteristics.

In addition, recently, a flexible image display device is being developed so that the touch screen panel attached onto the flexible image display device also requires a flexible characteristic.

In general, in the touch screen panel, the sensing electrodes are formed of a transparent conductive material such as indium tin oxide (ITO). In this case, when the flexible touch screen panel is bent or folded, a crack is generated in the sensing electrodes so that a driving defect may be caused.

A touch screen panel that has a flexible characteristic, that is not easily damaged in various bending or deforming environments, and that may secure a strong conductive layer characteristic is required.

SUMMARY OF THE INVENTION

Accordingly, the present invention has been developed to provide a touch screen panel capable of securing a flexible characteristic and a strong conductive layer characteristic.

In order to achieve the foregoing and/or other aspects of the present invention, there is provided a touch screen panel, including a substrate having a first surface and a second surface opposite to the first surface, a plurality of first sensing electrodes formed on the first surface of the substrate to be connected in a first direction, a plurality of second sensing electrodes arranged between the first sensing electrodes and formed to be connected in a second direction that intersects the first direction, a plurality of first connecting patterns for connecting the first sensing electrodes in the first direction, a plurality of third sensing electrodes formed on the second surface of the substrate to overlap the first sensing electrodes, a plurality of fourth sensing electrodes arranged between the third sensing electrodes and formed to overlap the second sensing electrodes, and a plurality of second connecting patterns for connecting the fourth sensing electrodes in the second direction. The sensing electrodes of the first surface and the sensing electrodes of the second surface, formed to overlap each other, are electrically connected to each other through vertical connecting units for connecting the first surface of the substrate and the second surface of the substrate to each other.

In some embodiments, the sensing electrodes may have parts extending to interiors of the vertical connecting units so as to contact sensing electrodes of an opposite surface of the substrate.

In some embodiments, the sensing electrodes may have regions opened by the vertical connecting units.

In some embodiments, the substrate may be mesh-shaped so that the plurality of vertical connecting units are provided in a sensing region that one sensing electrode has.

In some embodiments, each of the sensing electrodes may be mesh-shaped so as to correspond to the mesh-shaped substrate.

In some embodiments, the touch screen panel may further include a plurality of first bridge patterns for connecting the second sensing electrodes in the second direction and a plurality of second bridge patterns for connecting the third sensing electrodes in the first direction.

In some embodiments, the first bridge patterns may be separated from the second sensing electrodes but may be electrically connected to the second sensing electrodes in upper or lower parts of the second sensing electrodes so as to connect the second sensing electrodes in units of lines in the second direction.

In some embodiments, the touch screen panel may further include an insulating layer interposed between the first connecting patterns and the first bridge patterns.

In some embodiments, the first bridge patterns may be electrically connected to the second sensing electrodes in the upper or lower parts of the second sensing electrodes through contact holes formed in the insulating layer.

In some embodiments, the first to fourth sensing electrodes and the first and second connecting patterns may be formed of a transparent electrode material, and the first and second bridge patterns may be formed of an opaque metal material.

In some embodiments, the touch screen panel may further include outside wiring lines for connecting the first sensing electrodes and the second sensing electrodes to an external driving circuit in units of lines in the first direction and the second direction.

In some embodiments, the first and second sensing electrodes may be arranged in the same layer.

In some embodiments, the substrate may be a thin film substrate formed of at least one selected from a group consisting of polyethylene terephthalate (PET), polycarbonate (PC), acryl, polymethylmethacrylate (PMMA), triacetyl cellulose (TAC), polyethersulfone (PES), and polyimide (PI).

As described above, according to the present invention, the sensing electrodes are formed on both surfaces of the substrate so as to overlap each other, and the sensing electrodes on both surfaces of the substrate are electrically connected to each other through the vertical connecting parts so that the driving defect of the touch screen panel may be minimized although a partial crack or short is generated, and that the flexible characteristic and the strong conductive layer characteristic may be secured.

In addition, the substrate and the sensing electrodes are formed to be mesh shaped so that the flexible characteristic may be improved.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION

Figure 1A:
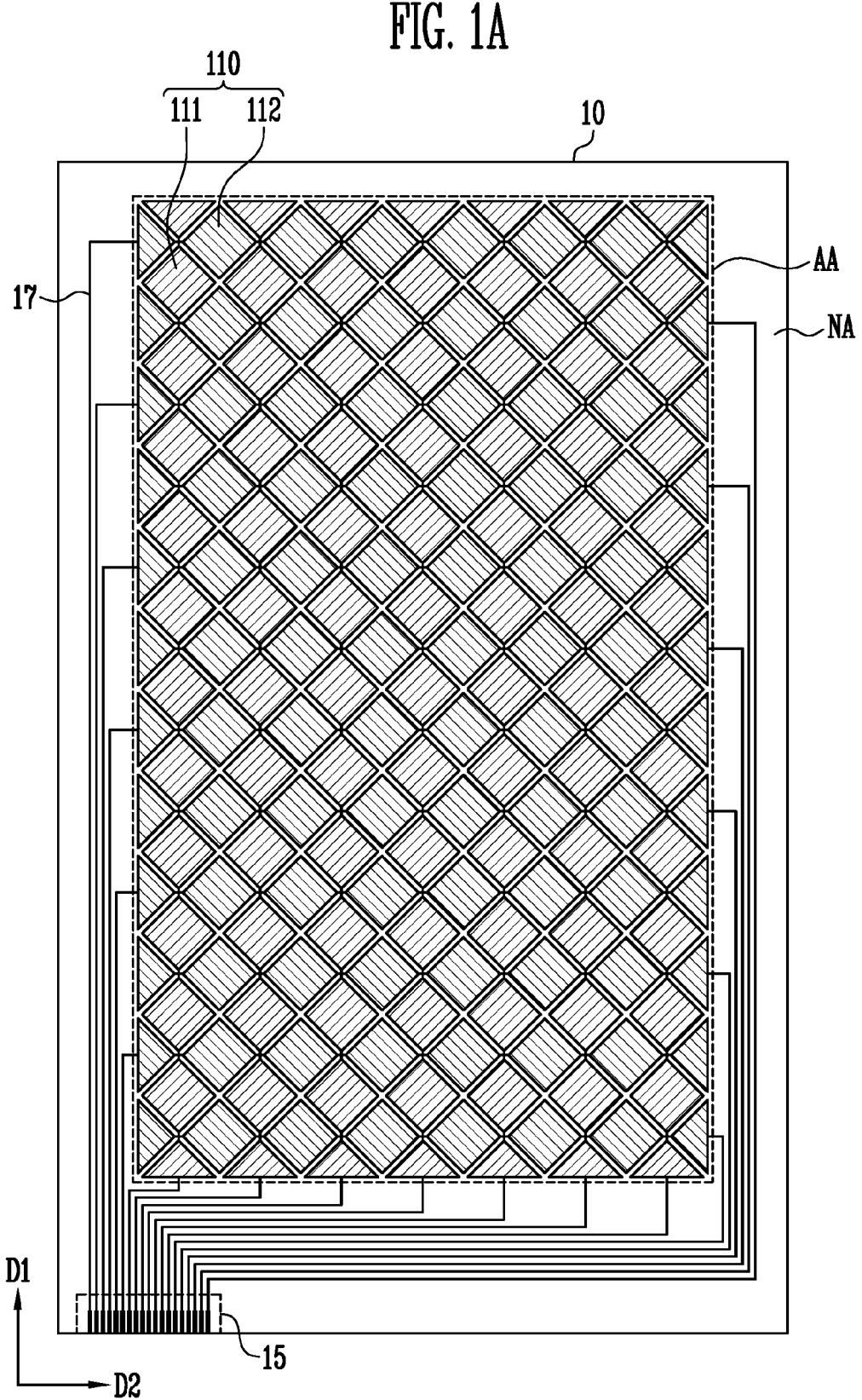
FIG. 1A is a plan view schematically illustrating a touch screen panel according to an embodiment of the invention.

In the following detailed description, only certain exemplary embodiments of the present invention are shown and described, simply by way of illustration. As those skilled in the art will realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or indirectly on the other element with one or more intervening elements interposed therebetween. Also, when an element is referred to as being "connected to" another element, it can be directly connected to the other element or indirectly connected to the other element with one or more intervening elements interposed therebetween. Hereinafter, like reference numerals refer to like elements.

Hereinafter, the embodiments of the present invention will be described in detail with reference to the accompanying drawings.

Figure 1B:
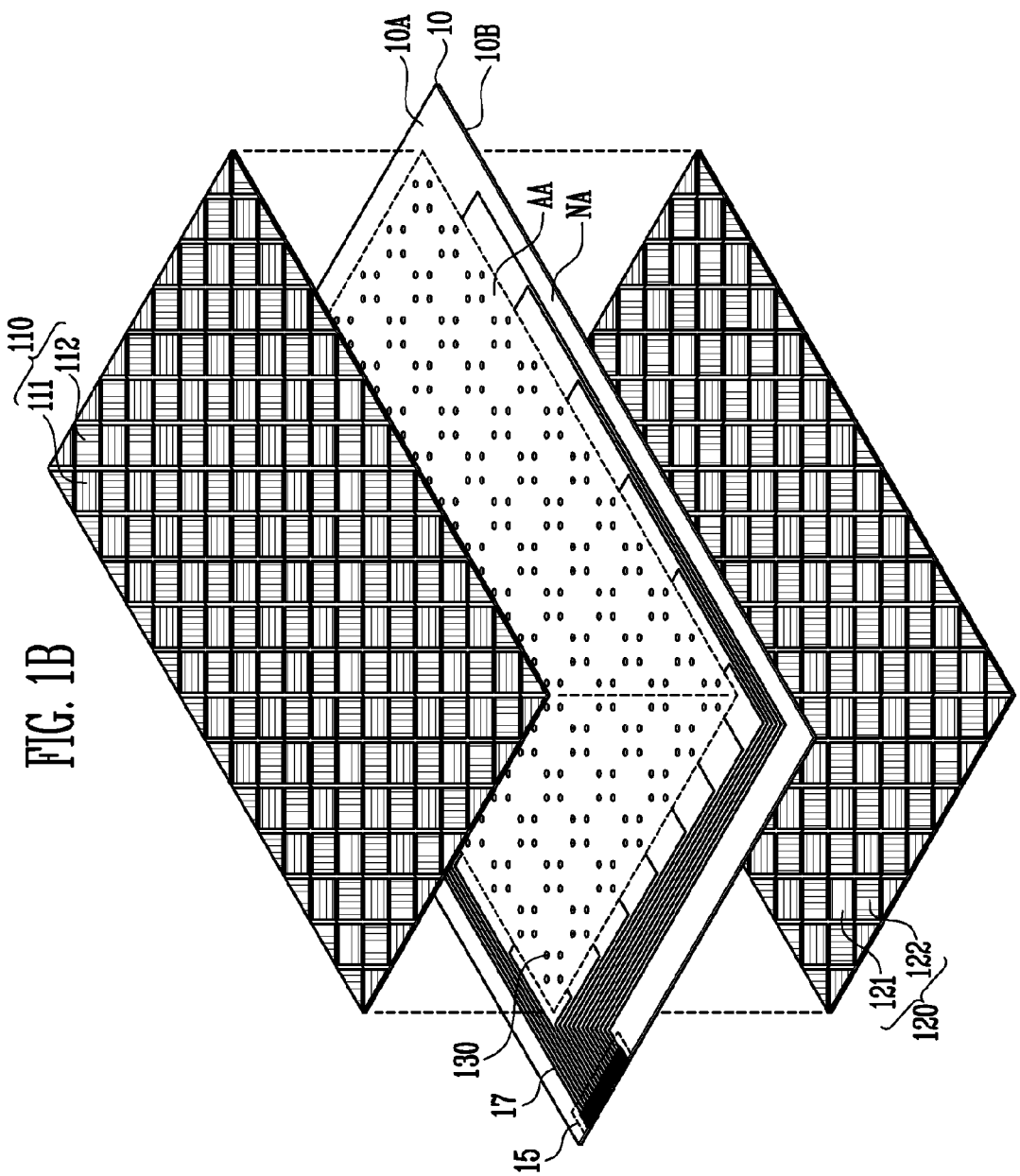
FIG. 1B is a perspective view illustrating the structure of the touch screen panel of FIG. 1A.

FIG. 1A is a plan view schematically illustrating a touch screen panel according to an embodiment of the present invention, and FIG. 1B is a perspective view illustrating the structure of the touch screen panel of FIG. 1A.

Referring to FIGS. 1A and 1B, a touch screen panel according to an embodiment of the present invention includes a substrate 10 having a first surface 10A and a second surface 10B opposite to the first surface 10A, sensing electrodes 110 of the first surface 10A of the substrate 10, sensing electrodes 120 of the second surface 10B of the substrate 10, and outside wiring lines 17 formed on the outside of the substrate 10 to connect the sensing electrodes 110 and 120 to an external driving circuit (not shown) through a pad unit 15.

The substrate 10 may be divided into a touch active area AA that overlaps an image display region and in which the sensing electrodes 110 and 120 are formed and a touch non-active area NA that is positioned on the outside of the touch active area AA and in which the outside wiring lines 17 are formed.

The substrate 10 is formed of a transparent material having a flexible characteristic and high thermal and chemical resistance, and may be a thin film substrate formed of at least one selected from the group consisting of, for example, polyethylene terephthalate (PET), polycarbonate (PC), acryl, polymethylmethacrylate (PMMA), triacetyl cellulose (TAC), polyethersulfone (PES), and polyimide (PI).

The sensing electrodes 110 of the first surface 10A of the substrate 10 include a plurality of first sensing electrodes 111 arranged to be distributed in the touch active area AA on the substrate 10 and formed to be electrically connected to each other in a first direction D1, and a plurality of second sensing electrodes 112 arranged to be distributed between the first sensing electrodes 111 but not to overlap the first sensing electrodes 111 and formed to be electrically connected to each other in a second direction D2 that intersects the first direction D1.

That is, the first sensing electrodes 111 and the second sensing electrodes 112 are alternately arranged to be connected in different directions. For example, the first sensing electrodes 111 may be formed to be connected in a column direction (a vertical direction) and may be connected to the outside wiring lines 17, respectively, in units of column lines, and the second sensing electrodes 112 may be formed to be connected in a row direction (a horizontal direction) and may be connected to the outside wiring lines 17, respectively, in units of row lines.

The first sensing electrodes 111 and the second sensing electrodes 112 may be formed of a transparent electrode material such as indium tin oxide (ITO) to transmit light. In the case where the sensing electrodes are formed on a thin film substrate having a flexible characteristic, when the flexible substrate is bent or folded, a partial crack or short may be generated in the sensing electrodes to cause a driving defect.

According to the present invention, in order to minimize the driving defect of the touch screen panel caused by damage to the sensing electrodes, the sensing electrodes are formed on both surfaces of the substrate so as to overlap each other, and the sensing electrodes on the both surfaces of the substrate are electrically connected to each other through vertical connecting units.

Concretely, as illustrated in FIG. 1B, a plurality of third sensing electrodes 121 are formed adjacent to the second surface 10B of the substrate 10 so as to overlap the first sensing electrodes 111, and a plurality of fourth sensing electrodes 122 are formed between the third sensing electrodes 121 so as to overlap the second sensing electrodes 112.

In addition, vertical connecting units 130 for connecting the first surface 10A and the second surface 10B to each other are formed on the substrate 10 and the sensing electrodes 110 of the first surface 10A, and the sensing electrodes 120 of the second surface 10B, formed to overlap each other, are electrically connected to each other through the vertical connecting units 130.

Concretely, the first sensing electrodes 111 are electrically connected to the third sensing electrodes 121, and the second sensing electrodes 112 are electrically connected to the fourth sensing electrodes 122.

The sensing electrodes and the vertical connecting units will be described in detail with reference to FIG. 2A which is a partial magnifying view illustrating sensing electrodes on a first surface of the touch screen panel of FIG. 1A and FIG. 2B which is a partial magnifying view illustrating sensing electrodes on a second surface of the touch screen panel of FIG. 1A.

The outside wiring lines 17 (FIGS. 1A and 1B) for connecting the first sensing electrodes 111 and the second sensing electrodes 112 to the external driving circuit in units of lines in the first direction D1 and the second direction D2 are electrically connected to, for example, the first and second sensing electrodes 111 and 112, respectively, in units of row and column lines to connect the first and second sensing electrodes 111 and 112, respectively, to the external driving circuit, such as a position detecting circuit, through the pad unit 15.

The outside wiring lines 17 arranged in the touch non-active area NA outside the touch screen panel to avoid the touch active area AA in which an image is displayed may be formed of a low resistance metal material such as Mo, Ag, Ti, Cu, Al, and Mo/Al/Mo other than a transparent electrode material used for forming the sensing electrodes.

Although not shown, the outside wiring lines for connecting the third sensing electrodes 121 and the fourth sensing electrodes 122 to the external driving circuit may be formed on the second surface 10B of the substrate as formed on the first surface 10A of the substrate.

When an object, such as a human hand or a stylus pen, contacts the above-described electro-capacitive touch screen panel, a change in capacitance in accordance with a contact position is transmitted from the sensing electrodes 110 and 120 to the driving circuit via the outside wiring line 17 and the pad unit 15. Then, the change in the capacitance is converted into an electrical signal by an X and Y input processing circuit (not shown) so that the contact position is grasped.

Since the electrically connected sensing electrodes 110 and 120 are arranged on both surfaces of the substrate 10 of the touch screen panel according to the present invention, a touch event generated on one surface has the same relationship as that of the touch event generated on the opposite surface. However, the present invention is not limited to the above, but the sensing electrodes of the both surfaces may be formed to be independently driven in a partial region.

Figure 2A:
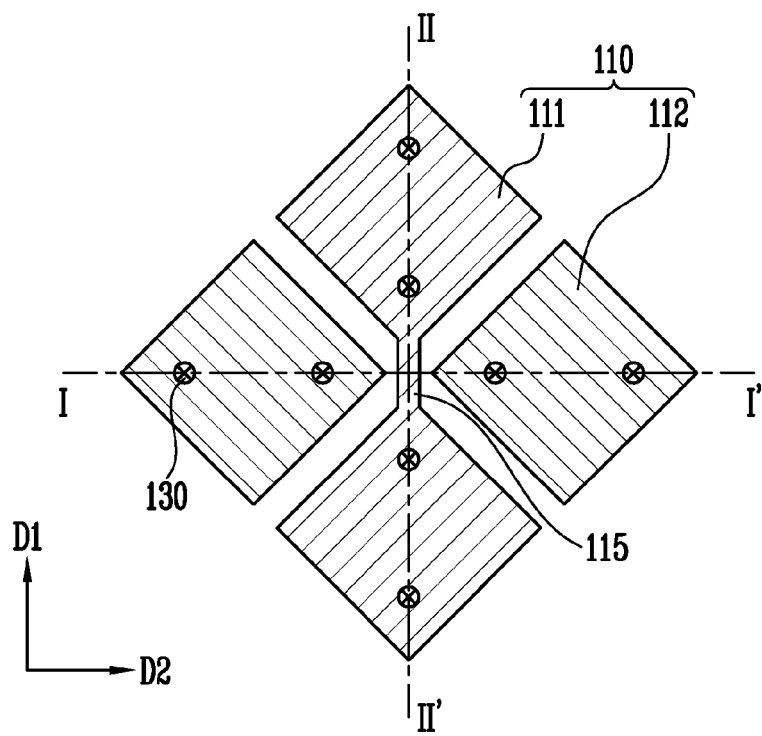
FIG. 2A is a partial magnifying view illustrating sensing electrodes on a first surface of the touch screen panel of FIG. 1A.
Figure 2B:
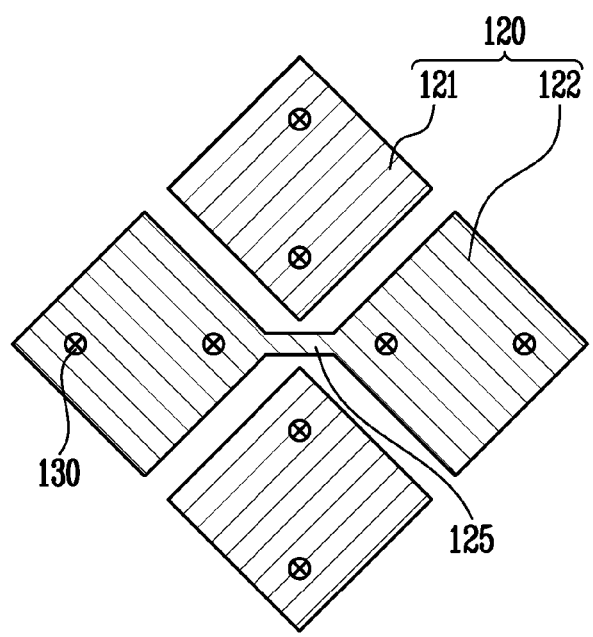
FIG. 2B is a partial magnifying view illustrating sensing electrodes on a second surface of the touch screen panel of FIG. 1A.
Figure 3A:
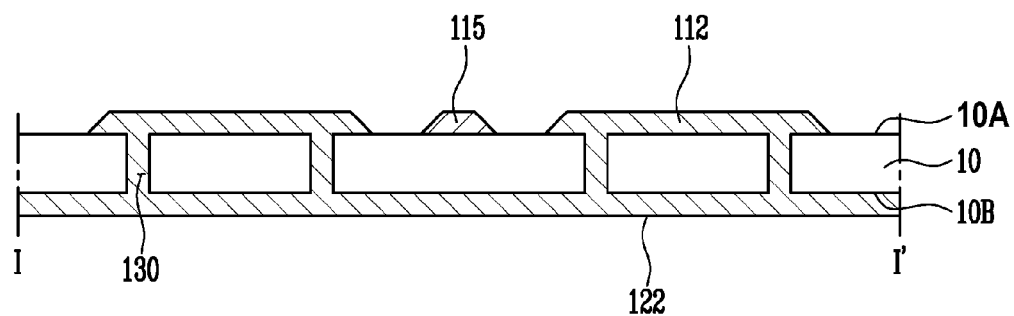
FIG. 3A is a partial sectional view of the touch screen panel taken along the line I-I' of FIG. 2A.
Figure 3B:
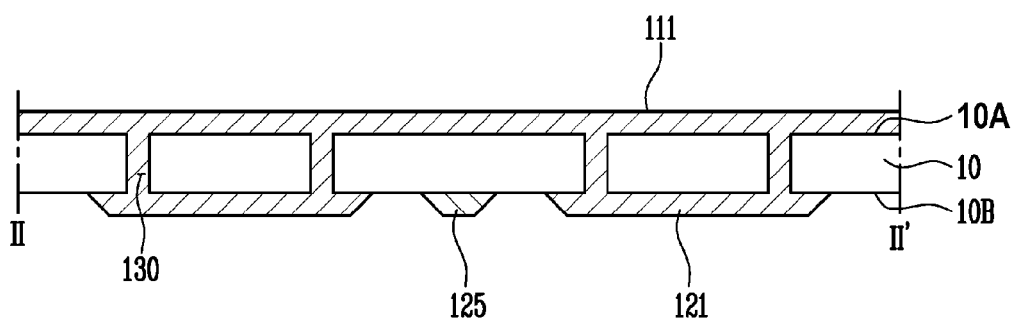
FIG. 3B is a partial sectional view of the touch screen panel taken along the line II-II' of FIG. 2A.

FIG. 3A is a partial sectional view of the touch screen panel taken along the line I-I' of FIG. 2A, and FIG. 3B is a partial sectional view of the touch screen panel taken along the line II-II' of FIG. 2A.

For convenience sake, in FIG. 2A, a partial region of the substrate 10 illustrated in FIG. 1A is magnified for illustration. However, in an actual touch screen panel, the structure illustrated in FIG. 2A is repeatedly provided on the first surface 10A of the substrate 10. The structure illustrated in FIG. 2B is repeatedly provided on the second surface 10B of the substrate 10.

Referring to FIGS. 2A to 3B, a touch screen panel according to some embodiments of the present invention includes the plurality of first sensing electrodes 111 formed on the first surface 10A of the substrate 10 to be connected in the first direction D1, the plurality of second sensing electrodes 112 arranged between the first sensing electrodes 111 and formed to be connected in the second direction D2 that intersects the first direction D1, and a plurality of first connecting patterns 115 for connecting the first sensing electrodes 111 in the first direction D1.

That is, the first sensing electrodes 111 are connected by the first connecting patterns 115 in the first direction D1 and the second sensing electrodes 112 have island-shaped patterns that are not connected so as to be separated from each other.

Here, the first and second sensing electrodes 111 and 112, respectively, may be formed of the same material, may be diamond-shaped, and may be arranged in the same layer. The material, shape, and arrangement structure of the first and second sensing electrodes 111 and 112, respectively, may have various modifications.

On the other hand, the touch screen panel includes the plurality of third sensing electrodes 121 formed on the second surface 10B of the substrate 10 so as to overlap the first sensing electrodes 111, the plurality of fourth sensing electrodes 122 arranged between the third sensing electrodes 121 and formed to overlap the second sensing electrodes 121, and a plurality of second connecting patterns 125 for connecting the fourth sensing electrodes 122 in the second direction D2.

That is, the third sensing electrodes 121 have island-shaped patterns that are not connected so as to be separated from each other, and the fourth sensing electrodes 122 are connected by the second connecting patterns 125 in the second direction D2.

The sensing electrodes 110 of the first surface 10A of the substrate 10 and the sensing electrodes 120 of the second surface 10B of the substrate 10 are formed to have the same shape so that the sensing regions of the sensing electrodes overlap each other. In the sensing electrodes 110 of the first surface 10A, the first sensing electrodes 111 are connected by the first connecting patterns 115 in the first direction D1. In the sensing electrodes 120 of the second surface 10B, the fourth sensing electrodes 122 are connected by the second connecting patterns 125 in the second direction D2.

In different embodiments, the sensing electrodes 110 of the first surface 10A of the substrate 10 and the sensing electrodes 120 of the second surface 10B of the substrate 10 may be formed so that partial sensing regions of the sensing electrodes overlap each other.

The first to fourth sensing electrodes 111, 112, 121, and 122, respectively, and the first and second connecting patterns 115 and 125, respectively, may be formed of a transparent electrode material including ITO.

When the first and second connecting patterns 115 and 125, respectively, are formed of the transparent electrode material, the sensing electrodes 110 and 120 and the connecting patterns 115 and 125 are patterned to be integrated from a process of patterning the transparent electrode material so that processes may be simplified.

The sensing electrodes 110 of the first surface 10A and the sensing electrodes 120 of the second surface 10B are electrically connected through the vertical connecting units 130 for connecting the first surface 10A and the second surface 10B to each other.

In some embodiments, the vertical connecting units 130 are a plurality of contact holes that pass through the substrate 10. In a process of forming the sensing electrodes 110 and 120 on the substrate 10 where the plurality of contact holes are formed, parts of the sensing electrodes 110 and 120 are extended to the interiors of the contact holes so that the sensing electrodes 110 and 120 formed on both surfaces 10A and 10B of the substrate 10 contact each other.

In particular, in the case of a thin film substrate, since the thickness of the substrate 10 is very small, the material of which the sensing electrodes 110 and 120 are formed may be easily filled in the contact holes of the substrate 10.

In the present embodiment, the two vertical connecting units 130 are formed in one sensing region. However, the number, size, and shape of the vertical connecting units 130 may vary.

The second sensing electrodes 112 formed on the first surface 10A of the substrate 10 so as to be separated from each other are electrically connected to the fourth sensing electrodes 122 formed on the second surface 10B of the substrate 10 so as to be connected to each other by the vertical connecting units 130. As a result, the second sensing electrodes 112 are separated from each other but are electrically connected to each other.

In addition, the third sensing electrodes 121 formed on the second surface 10B of the substrate 10 so as to be separated from each other are electrically connected to the first sensing electrodes 111 formed on the first surface 10A of the substrate 10 so as to be connected to each other by the vertical connecting units 130. As a result, the third sensing electrodes 121 are separated from each other but are electrically connected to each other.

As described above, according to the present invention, the sensing electrodes 110 and 120 are formed on both surfaces 10A and 10B of the substrate 10 so as to overlap each other, and the sensing electrodes on both surfaces 10A and 10B of the substrate are electrically connected to each other through the vertical connecting units 130 so that a driving defect of the touch screen panel may be minimized even though a partial crack or short is generated, and the flexible characteristic and the strong conductive layer characteristic may be secured.

Figure 4A:
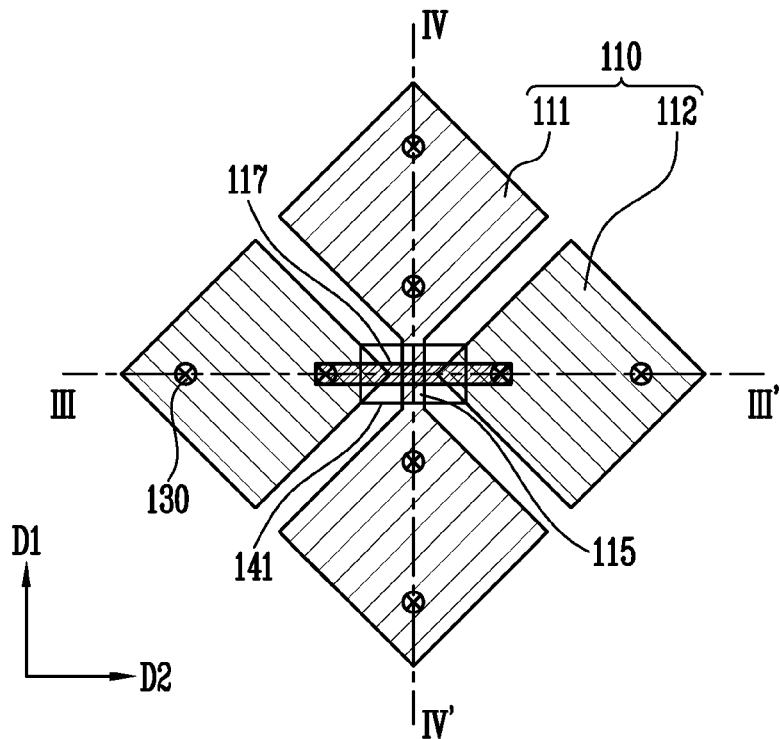
FIG. 4A is a partial magnifying view illustrating sensing electrodes on a first surface of a touch screen panel according to another embodiment of the present invention.
Figure 4B:
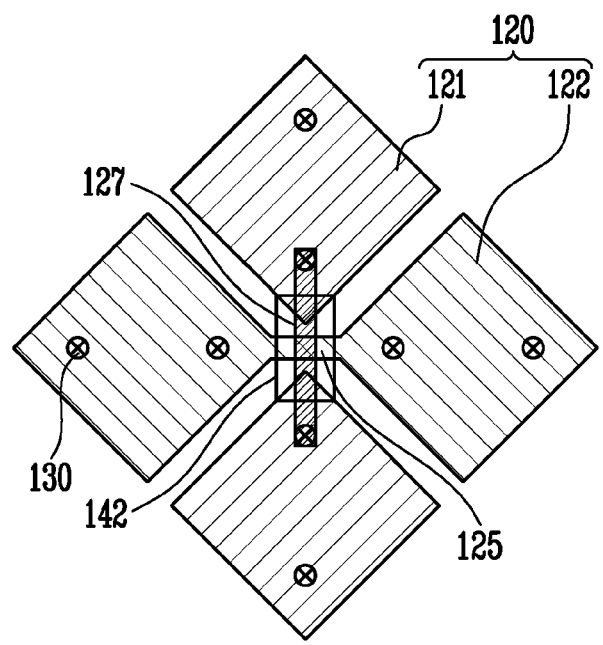
FIG. 4B is a partial magnifying view illustrating sensing electrodes on a second surface of a touch screen panel according to another embodiment of the present invention.
Figure 5A:
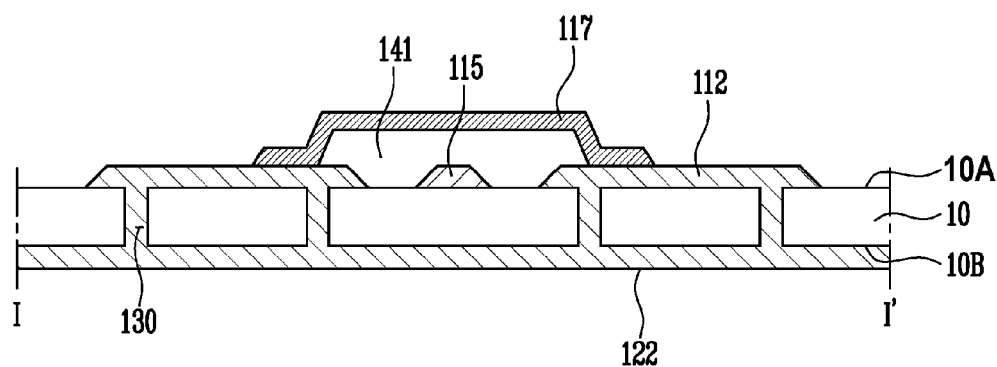
FIG. 5A is a partial sectional view of the touch screen panel taken along the line III-III' of FIG. 4A.
Figure 5B:
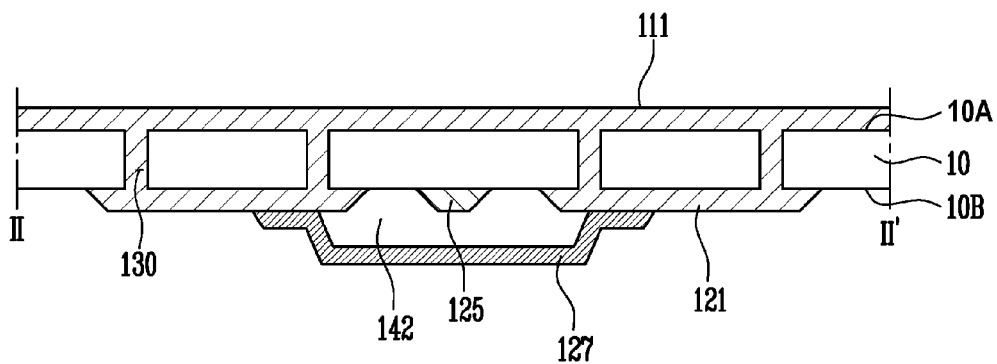
FIG. 5B is a partial sectional view of the touch screen panel taken along the line IV-IV' of FIG. 4A.

FIG. 4A is a partial magnifying view illustrating sensing electrodes on a first surface of a touch screen panel according to another embodiment of the present invention, FIG. 4B is a partial magnifying view illustrating sensing electrodes on a second surface of a touch screen panel according to another embodiment of the present invention, FIG. 5A is a partial sectional view of the touch screen panel taken along the line III-III' of FIG. 4A, and FIG. 5B is a partial sectional view of the touch screen panel taken along the line IV-IV' of FIG. 4A.

The above-described disclosure may be referred to with respect to the elements denoted by the same reference numerals as those of the above-described elements and redundant description of the elements will be omitted.

Referring to FIGS. 4A to 5B, the touch screen panel according to the present embodiment further includes a plurality of first bridge patterns 117 for connecting the second sensing electrodes 112 in the second direction D2 and a plurality of second bridge patterns 127 for connecting the third sensing electrodes 121 in the first direction D1.

The first bridge patterns 117 are separated from the second sensing electrodes 112 but are electrically connected to the second sensing electrodes 112 in the upper or lower parts of the second sensing electrodes 112 so as to connect the second sensing electrodes 112 in units of lines in the second direction D2.

The second bridge patterns 127 are separated from the third sensing electrodes 121 but are electrically connected to the third sensing electrodes 121 in the upper or lower parts of the third sensing electrodes 121 so as to connect the third sensing electrodes 121 in units of lines in the first direction D1.

In addition, the touch screen panel may further include a first insulating layer 141 interposed between the first connecting patterns 115 and the first bridge patterns 117 that overlap each other.

A second insulating layer 142 may be formed between the second connecting patterns 125 and the second bridge patterns 127.

Since the second bridge patterns 127 actually have the same structure as the first bridge patterns 117 and the second insulating layer 142 actually has the same structure as the first insulating layer 141, hereinafter, only the first bridge patterns 117 and the first insulating layer 141 will be described.

In some embodiments, the first insulating layer 141 may be partially provided between the first connecting patterns 115 and the first bridge patterns 117 in which insulating property is to be secured. In different embodiments, the first insulating layer 141 may be entirely formed in the touch active area AA so as to cover all of the sensing electrodes 110 of the first surface 10A of the substrate 10.

Additionally, in accordance with a design structure, in order to protect the patterns formed on the substrate 10, a protective layer (not shown) may be further formed entirely on both surfaces 10A and 10B of the touch screen panel.

The first bridge patterns 117 are formed of the same transparent electrode material as that of the sensing electrodes and the connecting patterns or an opaque low resistance metal material. The width, thickness, and length of the first bridge patterns 117 may be controlled so that it is possible to prevent the first bridge patterns 117 from being visible.

When the first bridge patterns 117 are formed of the opaque low resistance metal material, the first bridge patterns 117 may be simultaneously formed in a process of forming the outside wiring lines 17 arranged in the touch non-active area NA so that processes may be simplified. That is, the first bridge patterns 117 may be formed of the same material as that of the outside wiring lines 17 in the same layer.

The width of the first bridge patterns 117 is limited to prevent the first bridge patterns 117 from being visible. Therefore, the width of the first bridge patterns 117 may be smaller than the width of the first connecting patterns 115 formed of the transparent electrode material.

In some embodiments, the first bridge patterns 117 may be designed to be obliquely inclined so that it is possible to effectively prevent the first bridge patterns 117 from being visible.

Figure 6A:
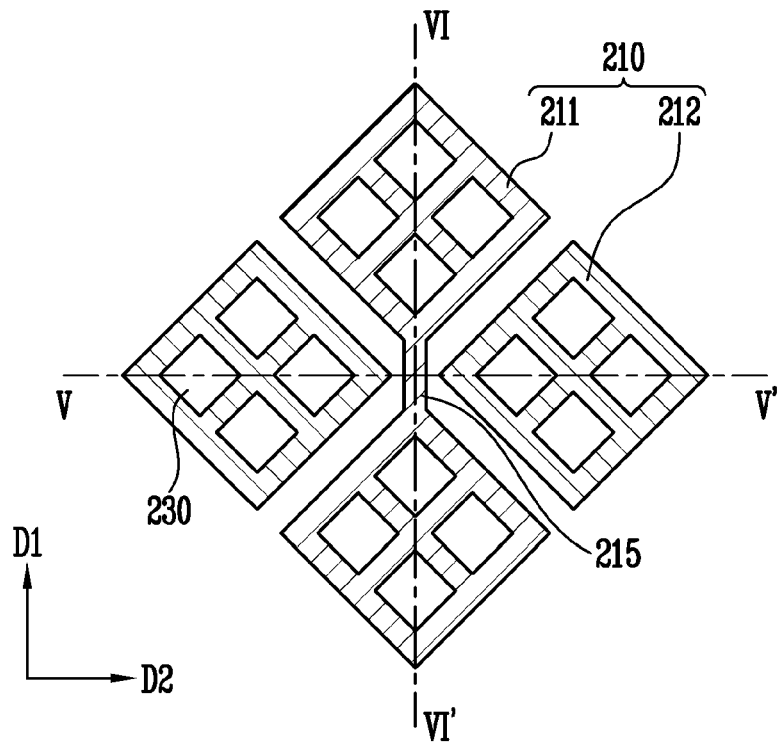
FIG. 6A is a partial magnifying view illustrating sensing electrodes on a first surface of a touch screen panel according to still another embodiment of the present invention.
Figure 6B:
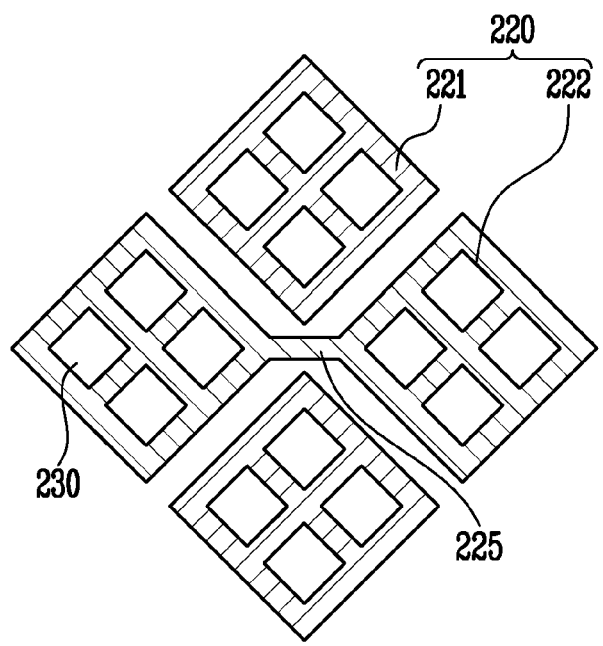
FIG. 6B is a partial magnifying view illustrating sensing electrodes on a second surface of a touch screen panel according to still another embodiment of the present invention.
Figure 7A:
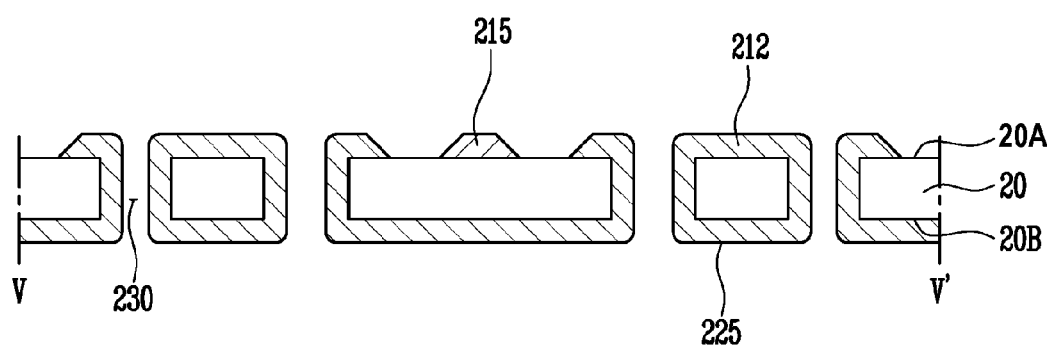
FIG. 7A is a partial sectional view of the touch screen panel taken along the line V-V' of FIG. 6A.
Figure 7B:
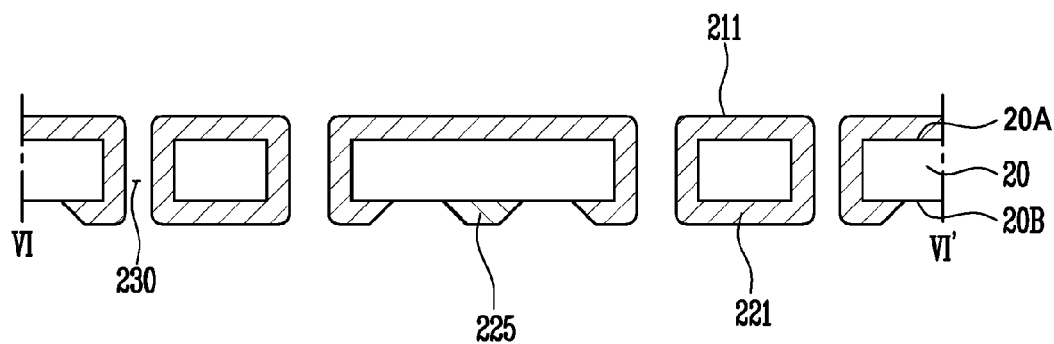
FIG. 7B is a partial sectional view of the touch screen panel taken along the line VI-VI' of FIG. 6A.

FIG. 6A is a partial magnifying view illustrating sensing electrodes on a first surface of a touch screen panel according to still another embodiment of the present invention, FIG. 6B is a partial magnifying view illustrating sensing electrodes on a second surface of a touch screen panel according to still another embodiment of the present invention, FIG. 7A is a partial sectional view of the touch screen panel taken along the line V-V' of FIG. 6A, and FIG. 7B is a partial sectional view of the touch screen panel taken along the line VI-VI' of FIG. 6A.

The above-described disclosure may be referred to with respect to the elements denoted by the same reference numerals as those of the above-described elements and redundant description of the elements will be omitted.

Referring to FIGS. 6A to 7B, the touch screen panel according to the present embodiment is mesh-shaped so that sensing electrodes 210 and 220 have regions opened by vertical connecting units 230.

Concretely, a substrate 20 is mesh-shaped so that the plurality of vertical connecting units 230 are provided in a sensing region that one sensing electrode has and each of the sensing electrodes is mesh-shaped to correspond to the mesh-shaped substrate 20.

Here, the substrate 20 may be patterned by an exposure method using a photosensitive dry film so that the mesh-shaped porous substrate 20 is realized or a plurality of openings, that is, the vertical connecting units 230, may be formed in the substrate 20 by performing local patterning on the substrate 20 by dry or wet etching.

In the present embodiment, the four square vertical connecting units 230 are formed in one sensing region. However, the number, size, and shape of the vertical connecting units 230 may vary.

In different embodiments, the vertical connecting units 230 may be formed in regions among the separated sensing electrodes as well as in the sensing regions of the sensing electrodes.

In the present embodiment, other than the characteristic of the vertical connecting units 230, since the structures of the sensing electrodes 210 and 220 and the first and second connecting patterns 215 and 225, respectively, formed on both surfaces 20A and 20B of the substrate 20 are actually the same as those of the above-described embodiments, description thereof will be omitted.

The touch screen panel according to the present embodiment is mesh-shaped so as to have higher flexibility and elasticity. Since the sensing electrodes 210 and 220, as well as the substrate 20, have a strong structure against external force that causes deformation, the flexible characteristic and durability of the touch screen panel may be improved.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel, comprising:
   a substrate having a first surface and a second surface opposite to the first surface;
   a plurality of first sensing electrodes formed on the first surface of the substrate and electrically connected in a first direction;
   a plurality of second sensing electrodes arranged between the first sensing electrodes and electrically connected in a second direction that intersects the first direction;
   a plurality of first connecting patterns connecting the first sensing electrodes in the first direction, each first connecting pattern, which electrically connects two of the first sensing electrodes, being disposed between two of the plurality of second sensing electrodes that are immediately adjacent to said two of the first sensing electrodes;
   a plurality of third sensing electrodes formed on the second surface of the substrate and overlapping with the first sensing electrodes;
   a plurality of fourth sensing electrodes arranged between the third sensing electrodes and overlapping with the second sensing electrodes; and
   a plurality of second connecting patterns connecting the fourth sensing electrodes in the second direction, each second connecting pattern, which electrically connects two of the fourth sensing electrodes, being disposed between two of the plurality of third sensing electrodes that are immediately adjacent to said two of the fourth sensing electrodes;
   the sensing electrodes of the first surface and the sensing electrodes of the second surface overlapping with each other and electrically connected to each other through vertical connecting units for connecting the first surface of the substrate and the second surface of the substrate to each other.

2. The touch screen panel as claimed in claim 1, the sensing electrodes having parts extended to interiors of the vertical connecting units so as to contact sensing electrodes of an opposite surface of the substrate.

3. The touch screen panel as claimed in claim 2, the sensing electrodes having regions opened by the vertical connecting units.

4. The touch screen panel as claimed in claim 3, the substrate being mesh-shaped so that the plurality of vertical connecting units are provided in a sensing region that one sensing electrode has.

5. The touch screen panel as claimed in claim 4, each of the sensing electrodes being mesh-shaped so as to correspond to the mesh-shaped substrate.

6. The touch screen panel as claimed in claim 1, further comprising:
   a plurality of first bridge patterns connecting the second sensing electrodes in the second direction; and
   a plurality of second bridge patterns connecting the third sensing electrodes in the first direction.

7. The touch screen panel as claimed in claim 6, the first bridge patterns being separated from the second sensing electrodes but electrically connected to the second sensing electrodes in one of upper and lower parts of the second sensing electrodes so as to connect the second sensing electrodes in units of lines in the second direction.

8. The touch screen panel as claimed in claim 7, further comprising an insulating layer interposed between the first connecting patterns and the first bridge patterns.

9. The touch screen panel as claimed in claim 8, the first bridge patterns being electrically connected to the second sensing electrodes in said one of the upper and lower parts of the second sensing electrodes through contact holes formed in the insulating layer.

10. The touch screen panel as claimed in claim 6, the first to fourth sensing electrodes and the first and second connecting patterns being formed of a transparent electrode material, and the first and second bridge patterns being formed of an opaque metal material.

11. The touch screen panel as claimed in claim 1, further comprising outside wiring lines for connecting the first sensing electrodes and the second sensing electrodes to an external driving circuit in units of lines in the first direction and the second direction.

12. The touch screen panel as claimed in claim 1, the first and second sensing electrodes being arranged in a same layer.

13. The touch screen panel as claimed in claim 1, the substrate comprising a thin film substrate formed of at least one selected from a group consisting of polyethylene terephthalate (PET), polycarbonate (PC), acryl, polymethylmethacrylate (PMMA), triacetyl cellulose (TAC), polyethersulfone (PES), and polyimide (PI).

* * * * *